(12) United States Patent  (10) Patent No.: US 8,677,327 B2
Huang et al.  (45) Date of Patent: Mar. 18, 2014

(54) SERVICE TESTING METHOD AND SERVICE TESTING SYSTEM

(75) Inventors: He Yuan Huang, Beijing (CN); Shih-Gong Li, Beijing (CN); Zhong Jie Li, Beijing (CN); Jun Zhu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 1383 days.

(21) Appl. No.: 12/099,999

(22) Filed: Apr. 9, 2008

(65) Prior Publication Data

US 2009/0007073 A1   Jan. 1, 2009

(30) Foreign Application Priority Data

Apr. 9, 2007 (CN) .......................... 2007 1 0091775

(51) Int. Cl.
  *G06F 9/44* (2006.01)
  *G06F 9/455* (2006.01)
(52) U.S. Cl.
  USPC ........................................... 717/135; 703/27
(58) Field of Classification Search
  USPC ............................................................ 717/135
  See application file for complete search history.

(56) References Cited

U.S. PATENT DOCUMENTS

| 6,662,312 | B1* | 12/2003 | Keller et al. .................. 714/38.14 |
| 6,804,796 | B2* | 10/2004 | Gustavsson et al. ......... 714/38.1 |
| 7,028,223 | B1* | 4/2006 | Kolawa et al. ............... 714/38.14 |
| 7,120,703 | B2* | 10/2006 | Li et al. .......................... 709/246 |
| 7,305,654 | B2* | 12/2007 | Patel et al. ..................... 717/101 |
| 7,631,299 | B2* | 12/2009 | Kannenberg .................. 717/121 |
| 7,788,647 | B2* | 8/2010 | Martin et al. ................. 717/135 |
| 7,822,587 | B1* | 10/2010 | Krimstock et al. ........... 717/135 |
| 8,069,435 | B1* | 11/2011 | Lai ................................. 717/106 |
| 2005/0066307 | A1* | 3/2005 | Patel et al. ...................... 717/124 |
| 2005/0114830 | A1* | 5/2005 | Knutson et al. ............... 717/102 |
| 2005/0166094 | A1 | 7/2005 | Blackwell |
| 2005/0240794 | A1 | 10/2005 | Sinha |
| 2005/0256665 | A1 | 11/2005 | Hartmann |
| 2006/0206567 | A1* | 9/2006 | Milligan et al. .............. 709/206 |

OTHER PUBLICATIONS

Bai et al., "WSDL-Based Automatic Test Case Generation for Web Services Testing"; IEEE, 2005; 7pg.*
Jai et al., "Rigorous and Automatic Testing of Web Applications"; Conference on Software Engineering and Applications, 2002, 6pg.*
Tsai et al., "Specification-Based Verification and Validation of Web Services and Service-Oriented Operating Systems"; IEEE, 2005, 9pg.*
Yang, et al., "Constructing an object-oriented architecture for Web application testing"; Journal of Information Science and Engineering, Jan. 2002; p. 59-84.*

* cited by examiner

*Primary Examiner* — Ryan Coyer
(74) *Attorney, Agent, or Firm* — William Stock; Anne Vachon Dougherty (57) ABSTRACT

The present invention provides a service testing method and system using a surrogate. The service testing method comprises steps of: generating, according to service description of a service to be simulated, a service-specific surrogate for said service to be simulated; deploying the generated service-specific surrogate onto a runtime system; specifying a test case by referring to the generated service-specific surrogate, wherein said test case comprises test configuration; and setting, according to the test configuration, a configuration option of the deployed surrogate on the runtime system. In the service testing method and system according to the present invention, parameters of the surrogate are dynamically configured without necessity of rewriting and deployment, thereby reducing the burden of designing and generating Mock objects.

16 Claims, 4 Drawing Sheets

SERVICE TESTING METHOD AND SERVICE TESTING SYSTEM

TECHNICAL FIELD

The present invention generally relates to the software testing field, and particularly relates to service testing techniques using simulation tools in the development of service-oriented software.

BACKGROUND OF THE INVENTION

Software testing plays an important role in the development of computer software and is used to confirm whether or not the quality or performance of a software program conforms to some requirements raised before the development of the software. Software testing is an inspection of software requirement analysis, design specification description and coding before software is put into practice and is a key step for guaranteeing software quality. Software testing is a process of executing a program in order to find errors. Software testing may be divided into unit testing and integration testing, wherein unit testing is a testing of the minimum unit of software design, i.e., a module, while integration testing is a testing of the whole software system. After respective modules having passed unit testing are assembled together according to design requirements, integration testing is performed so as to find various interface-related errors.

Today, service-oriented software development has two important features: distributed, and community-based. This makes it necessary to perform simulation of real services whose development has not been completed yet. Considering a typical scenario in service unit & integration testing, in which some services are not implemented yet, or although implemented, they reside in a remote site and thus cannot be easily configured & used locally. In this case, it is necessary to perform simulation of these real services.

Service simulation includes at least the following two aspects: functional and non-functional. In the functional aspect, it is needed to simulate responses of real services to different requests, i.e., to simulate whether these services are capable of implementing or accomplishing predetermined functions or not. In the non-functional aspect, it is needed to simulate properties of these services, such as performance, availability, security, response time and so on.

Here, it is noted that the services in this document may indicate modules, processes and the like having predetermined functions in the software development.

The key of the service simulation is to provide a quasi-realistic execution environment for the real services under test (either unit or integration test). Since each service needs to deal with various usage scenarios (which include at least normal and exception conditions) to test these different scenarios, the simulated services should be flexible for implementing changes in behavior (i.e., have versatility) for simulating various different scenarios that can occur in the real world.

The following Table 1 lists common simulation methods used in conformity with the prior art in the real software testing (following Object-Oriented terms).

TABLE 1

| Method | Features | How to use in testing |
| --- | --- | --- |
| Stub | Static, simplified implementations of real classes, stored in a file system, returning a specific response to a specific request on invocation. | Test case is separate from Stub, and test case uses Stub like real classes. |
| | Stub can invoke methods of other classes Test logic (invocation sequences & input-output mapping) is hard-coded in Stub implementation & test cases. | To simulate different behavior of an object, multiple Stubs are needed, or it is needed to modify these Stubs for different test cases. |
| Mock | Its behavior can be specified programmatically, including the input-output mapping & invocation sequencing. Mock provides a built-in tool to verify the invocation sequence & input-output (mapping) as previously set in a test case. A Mock object cannot invoke methods of other objects. | Test cases dynamically create and use Mock objects. |

"Stub" is used to denote temporary and simple program codes that simulate functions of more complex codes. Stubs and real implementations have the same method definition so that method callers can use both in the same way. Here an example of a real class "Collaborator" and its Stub can be found from http://blog.interface21.com/main/2007/01/15/unit-testing-with-stubs-and-mocks/. Stub is a simplified and partial implementation of real code logic. Usually, it only describes output messages for specific input messages.

"Mock" (see http://www.easymock.org/) is used to denote a special kind of simulation mechanism using predefined application programming interfaces (APIs). Firstly, Mock objects are created at runtime, as is their behavior (what response is produced for what request). Secondly, Mock provides a built-in mechanism for test verification.

More details regarding unit testing of Mock and Stub can also be found by referring to http://blog.interface21.com/main/2007/01/15/unit-testing-with-stubs-and-mocks.

Simply speaking, the key difference between Mock and Stub is that Mock predefines a verification (assertion) tool that makes test logic writing easier than Stub where verification logic has to be hard-coded.

However, both Stub & Mock are not versatile in their behavior. Stub is a simplified implementation of real objects, and not versatile enough in its behavior. Complex test logic usually requires a lot of Stubs and a lot of simulation codes, and is difficult to manage. The behavior of Mock in a specific test case is also fixed, representing a specific test scenario.

In addition, with both Stub and Mock, it is not possible to easily simulate the non-functional aspect of the services. In other words, they are not designed to deal with non-functional simulation.

Furthermore, Mock has the following disadvantages: a Mock object cannot invoke methods outside, making it not suitable to be used in integration testing that requires a Mock object to initiate invocation of other objects.

SUMMARY OF THE INVENTION

In order to provide basic understanding of some aspects of the present invention, a brief summary of the present invention is given hereinafter. It should be understood that this summary is not an exhaustive generalization of the present invention. It is not intended to determine critical or important parts of the present invention, nor is it intended to define the scope of the present invention. The summary is only used to give some concepts in a simplified form, which is used as prolegomenon of the following more detailed description discussed later.

An object of the present invention is to provide a simulation tool referred to as "surrogate" for simulating services so as to overcome the above-described problems existing in the simulation using Stub and Mock.

Another object of the present invention is to provide a testing system and a corresponding testing method for testing services using a surrogate to simulate the services in the development of service-oriented software, which can solve the above problems which existed in the prior art.

Still another object of the present invention is to provide a corresponding computer program, computer program product and computer-readable storage medium.

In order to accomplish the above objects, according to one aspect of the present invention, there is provided a service testing method using a surrogate, comprising steps of: generating, according to service description of a service to be simulated, a service-specific surrogate for said service to be simulated; deploying the generated service-specific surrogate onto a runtime system; specifying a test case by referring to the generated service-specific surrogate, wherein the test case includes test configuration; and setting, according to the test configuration, a configuration option of the deployed surrogate on the runtime system.

According to another aspect of the present invention, there is also provided a service testing system using a surrogate, comprising: a surrogate generator for generating, according to service description of a service to be simulated, a service-specific surrogate for said service to be simulated; a deployer for deploying the generated service-specific surrogate onto a runtime system; specifying means for specifying a test case by referring to the generated service-specific surrogate, wherein the test case includes test configuration; and setting means for setting, according to the test configuration, a configuration option of the deployed surrogate on the runtime system.

According to other aspects of the present invention, there are also provided the corresponding computer program, computer readable storage medium and computer program product.

Advantages of the present invention are to perform dynamic configuration at runtime according to the surrogate provided by the present invention and to further preferably have one or several of the following functions. Said functions comprise but are not limited to functional simulation, non-functional simulation, statistics and logging. That is to say, the surrogate is capable of providing more functions than the Sub and/or Mock.

A further advantage of the present invention is that in the service testing method and system according to the present invention, as for a service to be simulated whose development has not been completed yet, it is only necessary to generate a service-specific surrogate, deploy it into a runtime system, write a test case by referring to configuration information of the generated surrogate and then set or assign, during execution of the test case, parameters of the surrogate, thereby generating a specific surrogate. That is to say, during the testing executed according to the present invention, it is unnecessary to generate a plurality of Mock objects for a service to be simulated like the Stub and/or Mock, but the parameters of the surrogate can be dynamically configured without necessity of rewriting and deployment, so that the burden of designing and generating Mock objects can be reduced.

Still a further advantage of the present invention is that the surrogate can be used to support a plurality of test scenarios including service unit testing and service integration testing, whereas Mock can only be used in unit testing for simulating external interaction of an object under test.

These and other advantages of the present invention will be more apparent from the detailed description of preferred embodiments of the present invention below taken with reference to the accompanying drawings.

BRIEF DESCRIPTION OF THE DRAWINGS

The present invention will be better understood by referring to the following description taken in conjunction with the accompanying drawings, in which the same or similar reference signs are used to denote the same or similar elements throughout the drawings. The drawings together with the following detailed description are incorporated into the specification and formed as a part thereof, and are used to further illustrate preferred embodiments of the present invention and explain principles and advantages of the present invention, in which.

Those skilled in the art will appreciate that, elements or units in the drawings are illustrated only for simplicity and clarity and have not necessarily been drawn to scale. For example, the dimensions of some of the elements in the drawings may be enlarged relative to other elements to help to improve understanding of the embodiments of the present invention.

DETAILED DESCRIPTION OF THE PREFERRED EMBODIMENTS

Exemplary embodiments of the present invention will be described in conjunction with the accompanying drawings hereinafter. For the sake of clarity and conciseness, not all the features of actual implementations are described in the specification. However, it is to be appreciated that, during developing any of such actual implementations, numerous implementation-specific decisions must be made to achieve the developer's specific goals, for example, compliance with system-related and business-related constraints which will vary from one implementation to another. Moreover, it is also to be appreciated that, such a development effort might be very complex and time-consuming, but may nevertheless be a routine task for those skilled in the art having the benefit of this disclosure.

Furthermore, it is noted herein that, in order to avoid obscuring the present invention due to unnecessary details, the drawings only show device structures and/or processing steps closely related to the solutions according to the present invention and other details little related to the present invention are omitted.

Figure 1:
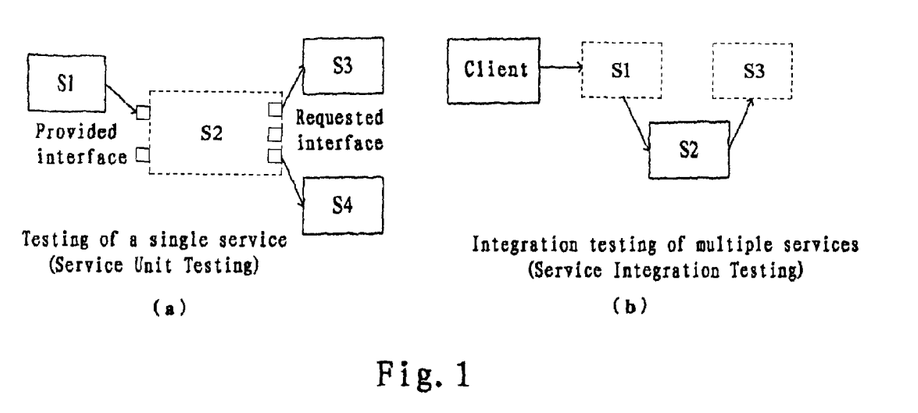
FIG. 1(a) and FIG. 1(b) illustrate a typical service unit testing scenario and a service integration testing scenario in the prior art, respectively.

FIG. 1(a) and FIG. 1(b) illustrate a typical service unit testing scenario and a typical service integration testing scenario, respectively. As shown in FIG. 1, in the development of service-oriented software, there exist two common testing scenarios: testing of a single service (i.e., service unit testing); and testing of multiple services (i.e., service integration testing). For both of the above scenarios, performance testing could be done. For the service unit testing, the performance of a single service can be tested; for the service integration testing, the comprehensive performance of real services can be tested in composition.

In FIG. 1, box(es) with broken lines represents a service whose development has been completed (that is, a module in software testing), such as Service S2 in FIG. 1(a) and Services S1 and S3 in FIG. 1(b), while box(es) with real lines represents a service whose development has not been completed yet, for example, Services S1, S3 and S4 in FIG. 1(a) and Service S2 in FIG. 1(b).

In the case of software testing, in the testing of those services whose development has been completed (i.e., real services), it is necessary to make simulation of services whose development has not been completed yet. Specifically, as shown in FIG. 1(a), unit testing of a real service S2 requires the simulation of services S1, S3 and S4. This simulation should be able to generate different inputs in order to interact with service S2. In addition, as shown in FIG. 1(b), integration testing of real services S1, S3 requires the simulation of service S2. On receiving invocation from Service S1, service S2 will invoke service S3.

The surrogate is further illustrated below in detail with reference to FIG. 2.

Figure 2:
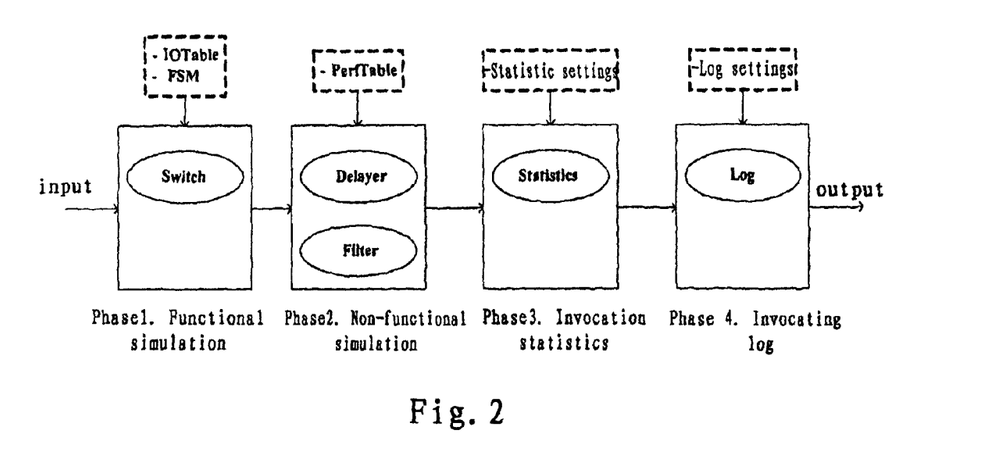
FIG. 2 illustrates an exemplary implementation of a surrogate according to an embodiment of the present invention.

FIG. 2 shows an exemplary implementation of a surrogate according to one embodiment of the present invention.

The surrogate according to the present invention can be dynamically configured by testers as needed. Preferably, the surrogate in the present invention may further have one or more of the following advantages: (1) built-in versatility and capable of easily performing a functional behavior simulation; (2) capability for performing NFR (non-functional requirement) emulation/assertion; and (3) statistics and logging functions.

As shown in FIG. 2, the surrogate utilizes four stages to implement functional simulation, non-functional simulation, statistics function and logging function, respectively. The dashed box represents configuration information that is required in each stage.

However, it is noted that FIG. 2 illustrates the primary functions of the surrogate in four aspects at four stages, but it does not mean that the surrogate is required to simultaneously have these four primary functions, or that these four primary functions are required to be simultaneously used in the real software testing. In addition, it may not necessarily mean the real executing order among these four primary functions, and testers are completely capable of selecting use of some or all of the functions in an appropriate order according to actual needs.

In summary, the surrogate may extend Stub & Mock objects in the following aspects of performance:

(1) A surrogate may have a set of built-in behavior specification methods. With a single surrogate, testers can write a lot of test cases with different test purposes, without necessity of writing or generating a plurality of surrogates. However, in the case of using Stub and/or Mock, there will be many Stub and/or Mock objects for different test purposes since their behavior is fixed.

(2) The non-functional aspect of a real service can be emulated/asserted with a surrogate. This is very useful for using the surrogate in NFR testing of services.

(3) Statistics of data or parameters such as "number of invocation" is also a built-in function in the surrogate. The statistics information can be used to obtain usage patterns of a specific service, and the surrogate or the real service behavior can be adjusted based on the usage patterns. For example, if a specific service operation of a surrogate is found to be invoked most frequently, then it needs to optimize such operation's performance. The surrogate also supports a logging function so that testing traces can be collected for later analysis.

(4) All the above capabilities of the surrogate are configurable, i.e., the same surrogate can be used to specify different test logics by means of dynamic configuration. Such configurability is built-in when the surrogate is generated. Testers need not encode such configurability manually. The surrogate can be stored in a file system and distributed together with service publishing; the surrogate can perform other testing related activities such as runtime service usage statistics & logging.

Here, it is necessary to emphasize that the performances of the surrogate in the above aspects may not necessarily exist at the same time.

It can be seen that, the surrogate is a valuable approach to enable distributed, community-based service development & testing.

The surrogate is a proposed new simulation tool which is specifically targeted for software testing. Its key features include one or more of the following features: versatile functional behavior, NFR emulation, statistics and logging. In addition, all these capabilities are configurable and need not be hard-coded. With such features, the surrogate can be used in various kinds of testing (including functional and non-functional) and greatly reduce testing efforts required to develop and manage a lot of Stubs & Mocks.

Service providers can distribute a surrogate as a trial-version of a real service for service consumers to evaluate in their own development environment if the functional & non-functional aspects of the real service can meet the requirements. Thus, compared with Stub & Mock, the surrogate is not a kind of throw-away stuff but can be reused later in a key service development scenario.

The primary functions of the surrogate are further illustrated below, respectively.

Suppose the definition of a service follows such a structure:
Service1
  Interface1
    Output Operation1 (Input)
    Output Operation2 (Input)
  Interface2
Functional Simulation Regarding the functional simulation of the surrogate, here we only mention two kinds of behavior simulation mechanisms as a reference implementation: Input/Output Mapping Table (IOTable) and Finite State Machine (FSM).

There can be several such input/output mapping tables for each operation of each interface, and test cases decide to use which one of them.

TABLE 2

| | Input/Output Mapping Table | | |
| --- | --- | --- | --- |
| | | Output message | |
| No. | Input message | Pattern | Parameters |
| 1 | +Msg1/* | Const/Random | Msg/Interval |

Each complex message can be expanded to allow users to set a valuation pattern of each field. A "random" pattern for the whole message equals to a "random" pattern for each field of the message.

TABLE 3

Finite State Machine (FSM)

| | Self.Interface1.operation2.input1 | Self.Interface1.-operation2.input2 |
|---|---|---|
| 1 | Action=Service_x.interface_y.-operation_z.input_1, Next_state=2 | Action=.., Next_state=... |
| 2 | Action=Service_x.interface_y.-operation_z.input_1, Next_state=2 | Action=.., Next_state=... |
| 3 | Action=Self.Interface1.operation2.-FaultOutput1, Next_state=ExceptionState | Action=.., Next_state=... |

In Table 3, rows represent states and columns represent inputs. An element in the matrix denotes the action of the service operation when being invoked: initiating another invocation, and transferring to a next state.

The second column of Table 3 shows: upon receiving invocation of Self.Interface1.operation2.input1 in State 1, initiating invocation of Service_x.interface_y.operation_z.input_1 and transferring the state to State 2; upon receiving invocation of Self.Interface1.operation2.input1 in State 2, initiating invocation of Service_x.interface_y.operation_z.input_1 and keeping in State 2; upon receiving invocation of Self.Interface1.operation2.input1 in State 3, returning to Self.Interface1.operation2.FaultOutput1 and transferring the state to ExceptionState.

The third column of Table 3 shows transfer cases of the respective states for another input Self.Interface1.operation2.input2, which are similar to those as shown in the second column. Thus, in order to avoid repetition, it is unnecessary to go into details.

Here, it is noted that not all the services are defined with FSM. The advantage of FSM is that it provides a simple way of describing service behavior, but not a general one. The combination of generality and simplicity is usually considered a pair of conflicting goals.

Non-Functional Simulation

Here we only mention one mechanism to specify non-functional simulation requirements, i.e., Performance Table (PerfTable).

TABLE 4

PerfTable

| | Interface_x.- | NFR metrics | | |
|---|---|---|---|---|
| No. | Operation_y | Metrics | Pattern | Internal |
| 1 | Operation 1 | Response_time | Performance Probability Function | <min, max> |
| 2 | Operation 2 | Availability | CONST | MTTF (Mean Time To Failure), MTTR (Mean Time To restoration) |

Statistics

Here we only mention one mechanism to specify statistics requirements, i.e., method invocation statistics.

TABLE 5

Method Invocation Statistics

| No. | Interface_x.Operation_y | Filter Conditions |
|---|---|---|
| 1 | Operation 1 | Some possible filter conditions: content patterns of input parameters, content patterns of output parameters, and invokers |

Herein, the filter of statistics specifies when the statistics action will be triggered. Table 5 only lists some possible filter conditions: content patterns of input parameters, content patterns of output parameters, and invokers. For example, when setting the filter condition "Invoker=Service 1" for "Operation 1", it indicates that the statistics is performed only when Service 1 initiates invocation of Operation 1.

Logging

Here we only mention one mechanism to specify logging requirements, i.e., Method Invocation Logging.

TABLE 6

Method Invocation Logging

| No. | Interface_x.Operation_y | Logging Level |
|---|---|---|
| 1 | Operation 1 | ERROR/WARN/INFO/DEBUG |

Herein, the level of log specifies the level of details. For example, the level of "ERROR" indicates that logging is only performed for errors which occurred in the invocation of this operation.

The above merely describes several common implementations of the functions of the surrogate, but those skilled in the art should understand that relevant functions of the surrogate can also be implemented in other ways.

A service testing method and service testing system for simulating services using a surrogate thereby to perform service testing according to the present invention are illustrated below with reference to FIGS. 3 to 5.

Figure 3:
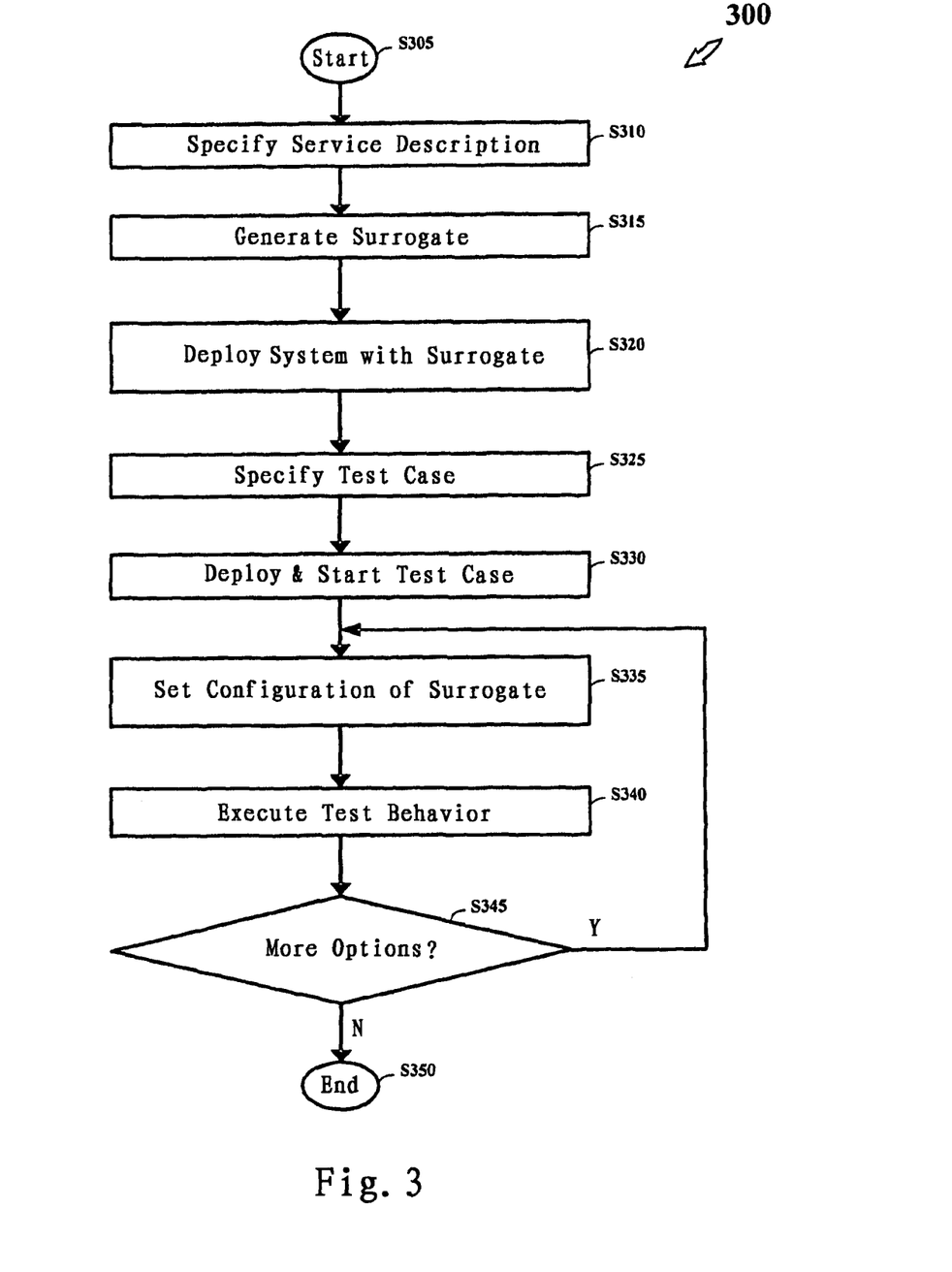
FIG. 3 is a flowchart of a service testing method for simulating services using a surrogate according to an embodiment of the present invention.

FIG. 3 is a flowchart of a service testing method 300 for performing service testing using a surrogate according to one embodiment of the present invention; FIG. 4 shows a schematic block diagram of a service testing system 400 for performing service testing using a surrogate according to one embodiment of the present invention; and FIG. 5 shows an exemplary application under test which is used in an embodiment of the present invention.

Figure 4:
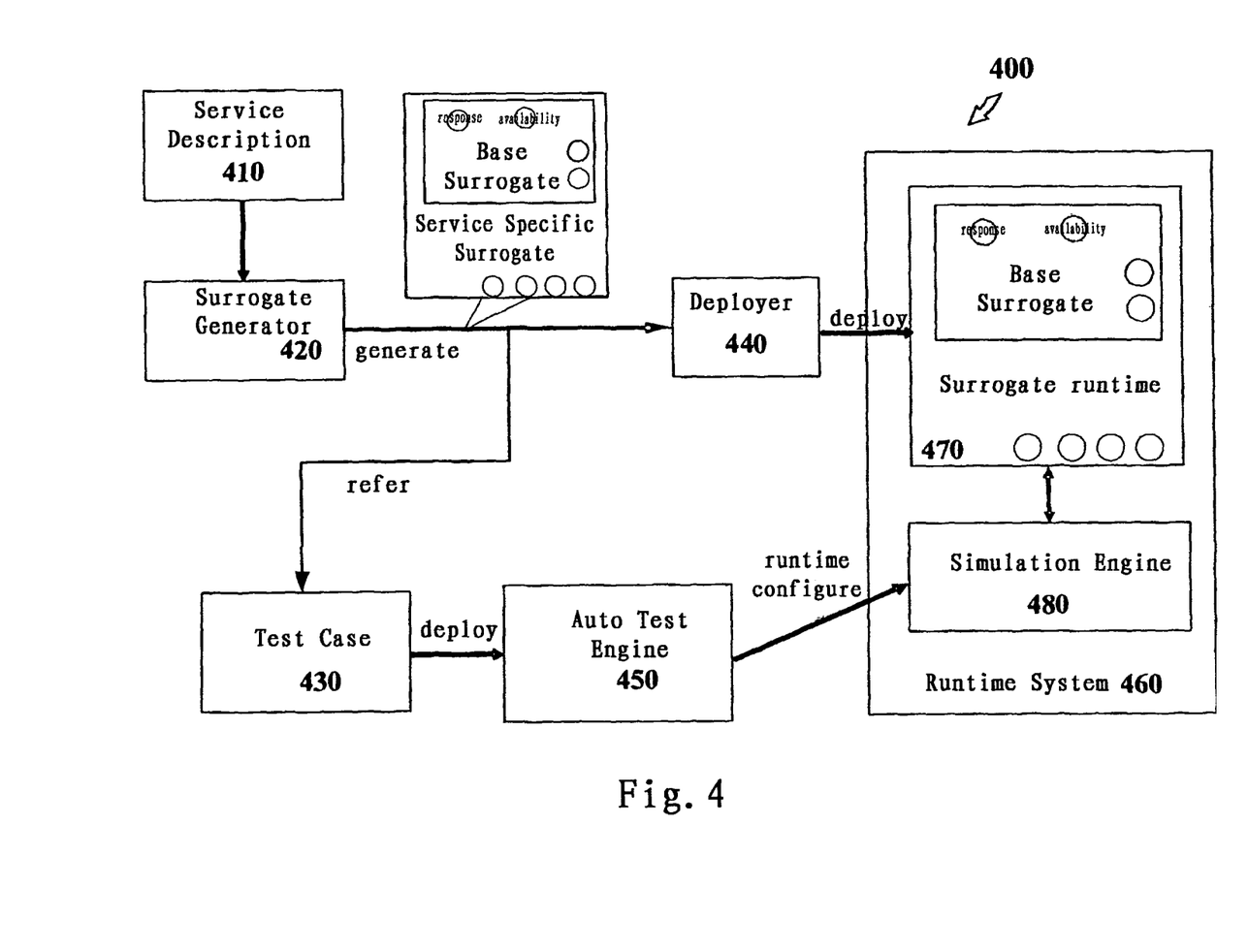
FIG. 4 shows a schematic block diagram of a service testing system for simulating services using a surrogate according to an embodiment of the present invention.

As shown in FIG. 4, the service testing system 400 mainly comprises: a service description 410, a surrogate generator 420, a test case 430, a deployer 440, an auto test engine 450, and a runtime system 460. The runtime system 460 further comprises a surrogate runtime 470 and a simulation engine 480.

Of course, the service testing system 400 or the runtime system 460 may further comprise other components depending upon different actual conditions, but these components are not shown in FIG. 4 for the sake of simplicity because they are little related to the present invention.

The service description 410 specifies the functional aspect, such as a function interface, and the non-function aspect, such as response time, of a service to be simulated. The service description can be automatically written or specified by testers by means of the prior art according to actual needs.

The surrogate generator 420 uses the service description 410 as an input and generates a service-specific surrogate for the service to be simulated. The generated service-specific surrogate inherits functions of a surrogate base class, i.e., BasicSurrogate, which provides the capability of communicating with the simulation engine and simulating the behavior of the service. Besides, the service-specific surrogate further includes service-specific code, such as the code for simulating the function interface. BasicSurrogate is a class implemented in advance in a surrogate development packet, and it provides the basic capability of communicating with the simulation engine and simulating the behavior of the service and encapsulates corresponding details. The surrogate generator 420 generates according to the service description the service-specific surrogate, which inherits BasicSurrogate and provides an implementation framework of an interface specified in the service description (specific processing logic which will be simulated by accessing an input & output data table) and other attributes selected for support, such as response time.

Before the execution of the test case, the deployer 440 deploys the generated service-specific surrogate onto the runtime system 460 so as to generate the surrogate runtime 470 on the runtime system 460.

The test case 430 generally includes two parts: TestConfiguration, which specifies configuration options for the surrogate, and TestBehavior, which specifies an execution path of the test case. Each configuration option of the surrogate is tested with each test path defined in TestBehavior. A sequence is a path to execute, and one sequence may include multiple sub sequences. Moreover, testers can use parallel or other operators to control the time relationship between sequences.

For the surrogate, testers can use external configuration information (ECI) to specify specific formats for, for example, function, performance, statistics analysis and the like.

Furthermore, it is noted that in a test case, there may be multiple configuration options for the same surrogate.

The test case 430, before execution, is deployed onto the auto test engine 450 which then performs runtime configuration of the simulation engine 480 on the runtime system 460. The runtime configuration may include a functional aspect (e.g., an input and output data correspondence table) and a non-functional aspect (e.g., delay of response time), etc.

The simulation engine 480 simulates the functional and/or non-functional behavior of the service in terms of the configuration of the service-specific surrogate. Moreover, the simulation engine may further dynamically change the configuration of the surrogate runtime 470 in terms of requests so as to generate a specific surrogate for the service to be simulated during execution of the test case.

As for how the respective components in the service testing system 400 as shown in FIG. 4 are specifically operated, further description will be given below with reference to the flowchart of the service testing method 300 as shown in FIG. 3 and the exemplary application shown in FIG. 5.

As shown in FIG. 3, the service testing method 300 starts at step S305. Then, at step S310, testers specify (or write) service description of the service to be simulated during testing in accordance with real needs and input it to the surrogate generator 420 shown in FIG. 4. According to different test purposes, the service description may include the functional and non-functional aspects, statistics, logging of the service to be simulated, and/or any combination thereof.

At step S315, the surrogate generator 420 uses the service description as an input and generates the corresponding service-specific surrogate. According to the service description, the surrogate generator will generate the service-specific surrogate, which inherits a surrogate base class, i.e., BasicSurrogate, and provides an implementation framework of an interface specified in the service description (the specific processing logic will be simulated by accessing an input and output data table), and other attributes selected for support, such as response time, etc.

At step S320, the deployer 440 shown in FIG. 4 deploys the generated service-specific surrogate to the runtime system 460 (as shown in FIG. 4) in terms of unavailable services (i.e., the services to be simulated).

At step S325, testers refer to the generated service-specific surrogate and specify (write) the test case according to the actual situation. The test case includes test configuration and test behavior for the surrogate.

At step S330, the specified test case is deployed onto the auto test engine 450 shown in FIG. 4 on which the test case is started to be executed.

At step S335, the auto test engine 450 searches for configuration options of the surrogate to be tested and sets configuration of the surrogate through the simulation engine 480.

Subsequently, at step S340, the auto test engine 450 executes test behavior along a test path defined in the test behavior of the test case 430.

Then, the processing of the service testing method 300 proceeds to step S345 to determine whether there are multiple surrogate configuration options to be tested.

If it is determined at step S345 that there are more surrogate configuration options to be tested, the processing flow will return to step S335 and the auto test engine 450 repeats the processes at steps S335 and S340 with respect to the next configuration option.

If it is determined at step S345 that there are no more surrogate configuration options to be tested, the processing flow will proceed to step S350 and the auto test engine 450 ends execution of the test case, that is, the processing of the method 300 ends.

The processing flow of the service testing method 300 according to one embodiment of the present invention is described above with reference to the flowchart shown in FIG. 3. However, it should be understood that the above processing flow is merely exemplary and the executing sequence of the respective steps therein is also merely exemplary. During the real testing, these steps in the testing method and the executing sequence thereof can be adjusted depending upon different actual conditions. For example, the sequence between steps S320 and S325 can be adjusted to execute step S325 and then execute step S320.

Figure 5:
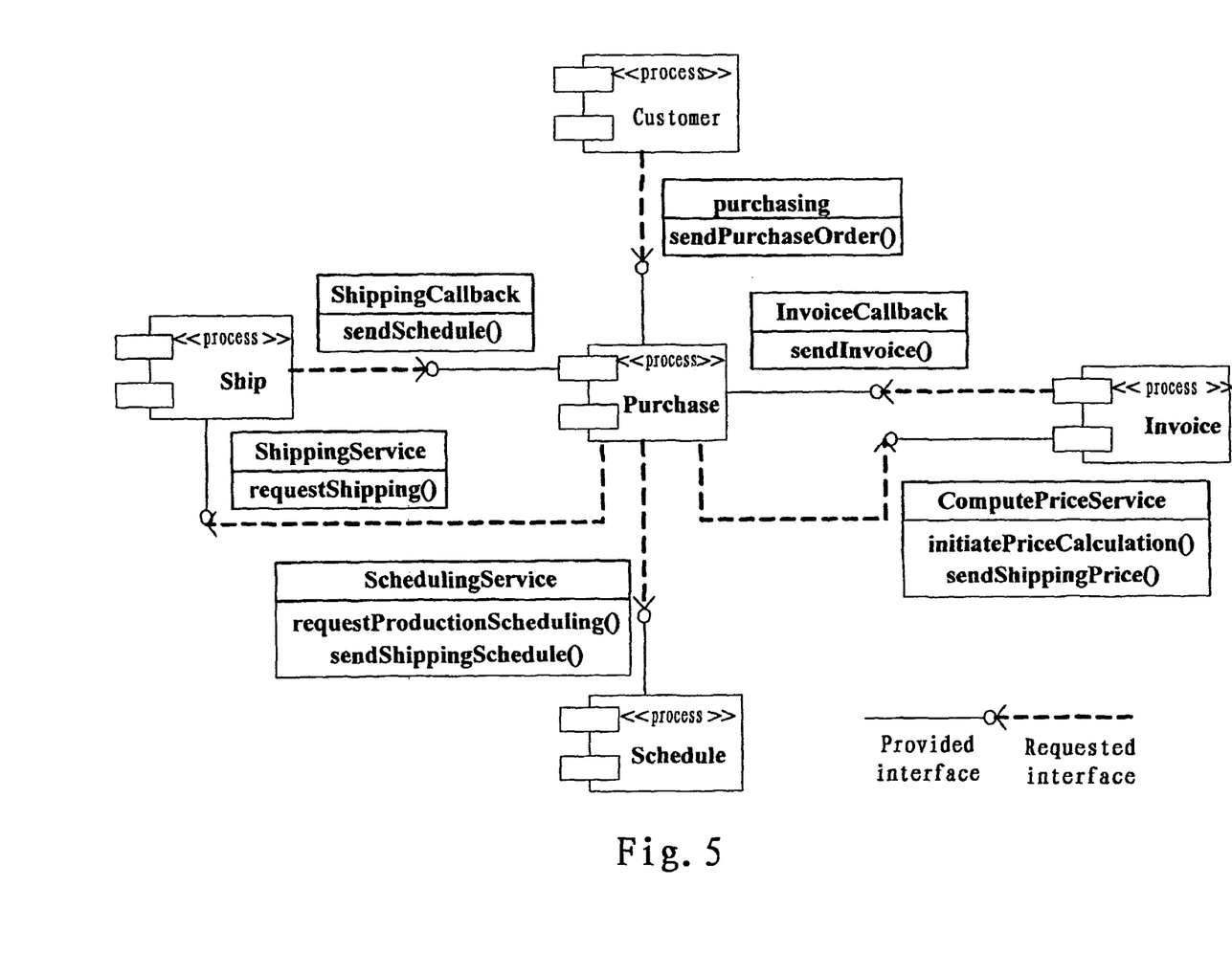
FIG. 5 illustrates an exemplary application to be tested, used in an embodiment of the present invention.

The application of the above service testing method 300 and the service testing system 400 will be further explained below by way of an example, with reference to an exemplary application to be tested used in an embodiment of the present invention as shown in FIG. 5.

As shown in FIG. 5, a key component of the exemplary application under test is a Purchase process. Interfaces that are provided by the purchase process and its partner processes worked therewith are shown in FIG. 5. The purchase process provides three interfaces: Purchasing, ShippingCallback and InvoiceCallback, each with one operation, i.e., sendPurchaseOrder( ), sendSchedule( ) and sendinvoice( ), respectively. Each partner process of the purchase process, i.e., Ship, Invoice and Schedule, provides one interface, i.e., ShippingService, ComputePriceService and SchedulingService, respectively. Moreover, the ShippingService interface has an operation requestShipping( ), the ComputerPriceService interface has operations initiatePriceCalculation( ) and sendShippingPrice( ), and the SchedulingService interface has two operations requestProductionScheduling( ) and sendShippingSchedule( ).

The purchase process runs as follows. After receiving a purchase order from a customer, the Purchase process communicates with its three partner processes, i.e., Ship, Invoice and Schedule, to accomplish its work. It initiates three tasks concurrently: requesting for shipment, calculating the price for the order, and scheduling the production and shipment for the order. Although some of the processing procedures can proceed concurrently, there are control and data dependencies between the three tasks. In particular, the shipping price is required to finalize the price calculation, and the shipping date is required for the complete fulfillment schedule. When the three tasks are completed, the invoice process can proceed so that the invoice is sent to the customer.

Suppose the Ship process defines the ShippingService interface as follows:

```
public interface ShippingService {
    public ShippingInfo requestShipping(ShippingRequest
    shippingRequest) throws java.lang.Exception;
}
```

Suppose the testing goal is to carry out service unit testing of the Purchase process. Moreover, assume that the Ship, Invoice and Schedule processes are not built yet, so a surrogate is used to simulate these three processes during testing.

The service-specific surrogate of the Ship process generated by the testing system 400 shown in FIG. 4 with the testing method described with reference to FIG. 3 is as follows:

```
public class ShippingServiceSurrogate    implements
ShippingService    extends BasicSurrogate {
    public ShippingInfo requestShipping(ShippingRequest
    shippingRequest) {
        IOTable iot;
        SurrogateConfiguration sc = getConfiguration( );
        iot = loadIOTable(sc);
        ShippingInfo shipInfo = (ShippingInfo)
        iot.getOperationReturn
        ("requestShipping(ShippingRequest)", shippingRequest)
        Return(shipInfo);
        } catch (Exception e) {
            thow(e);
        }
    }
}
```

Herein, three APIs, i.e., getconfiguration( ), loadIOTable( ) and getOperationReturn( ), are implemented in the surrogate base class, i.e., BasicSurrogate as functions that any extended surrogate can use to perform basic tasks. GetConfiguration( ) is used to set configuration files of the current surrogate, loadIOTable( ) is used to load configuration information into a memory of the runtime system, and getOperationReturn( ) is used to look up the input/out table IOTable to get a response value of the given operation with the given parameter.

During testing, such a surrogate will be generated for each unavailable service (i.e., each process whose development has not completed yet) so as to be used in a later running test case and to simulate the respective unavailable services which interact with the Purchase process.

Below is a specific test case based on the formats defined above. This test case is used to carry out unit testing of the Purchase process.

```
<?xml version="1.0" encoding="UTF-8"?>
<TestCase>
<TestConfiguration>
<Option>
 <Surrogates>
  <surrogate name="shipper" component="Ship" function="shipper_ECI_01"/>
  <surrogate name="invoicer" component="Invoice" function="invoicer_ECI_01"/>
  <surrogate name="scheduler" component="Schedule"
function="scheduler_ECI_01"/>
 </Surrogates>
</Option>
<Option>
 <Surrogates>
  <surrogate name="shipper" component="Ship" function="shipper_ECI_02"/>
  <surrogate name="invoicer" component="Invoice" function="invoicer_ECI_02"/>
  <surrogate name="scheduler" component="Schedule"
function="scheduler_ECI_02"/>
 </Surrogates>
</Option>
</TestConfiguration>
<TestBehavior>
 <sequence name="purchase">
  <event name="customerSendPO" sourceComponent="Customer"
targetComponent="Purchase" interface="purchasing" operation="sendPurchaseOrder"
direction="request" data='PurchaseOrderRequest-data-reference'/>
   <parallel>
    <sequence name="shippingService">
     <event name="requestShipping" sourceComponent="Purchase"
targetComponent="Ship" interface="ShippingService" operation="requestShipping"
direction="request" data='RequestShipping-data-reference'/>
     <event name="getShippingInfo" sourceComponent="Purchase"
targetComponent="Shipping" interface="ShippingService" operation="requestShipping"
direction="response" data='ShippingInfo-data-reference'/>
    </sequence>
    <sequence name="invoiceService">
     <event name="initPriceCalc" sourceComponent="Purchase"
```

-continued

```
targetComponent="Invoice" interface="ComputePriceService"
operation="initiatePriceCalculation" direction="request"
data='PurchaseOrderRequest-data-reference'/>
        <event name="sendShippingPrice" sourceComponent="Purchase"
targetComponent="Invoice" interface="ComputePriceService"
operation="sendShippingPrice" direction="request" data='ShipInfo-data-reference'/>
        <event name="getInvoice" sourceComponent="Purchase"
targetComponent="Invoice" interface="ComputePriceService"
operation="sendShippingPrice" direction="response" data='Invoice-data-reference'/>
    </sequence>
    <sequence name="schedulingService">
        <event name="requestScheduling" sourceComponent="Purchase"
targetComponent="Schedule" interface="SchedulingService"
operation="requestProductionScheduling" direction="request"
data='PurchaseOrderRequest-data-reference'/>
    </sequence>
  </parallel>
  <event name="customerGetInvoice" sourceComponent="Customer"
targetComponent="Purchase" interface="purchasing" operation="sendPurchaseOrder"
direction="response" data='Invoice-data-reference'/>
  </sequence>
</TestBehavior>
</TestCase>
```

<TestConfiguration> contained in this test case indicates the use of three surrogates, i.e., shipper, invoicer and scheduler, and configuration data used by the respective surrogates are indicated using function attributes (examples will be given later). Multiple sets of configuration data of the same surrogate are embodied in a plurality of <option> and during execution of the testing, each set of configuration is run once, thereby to improve testing coverage.

The <TestBehavior> part contained in this test case describes test sequences. Herein, each <event> is a service invocation or return. <sequence> represents an order executing logic and <parallel> represents a concurrency executing logic. In the present case, the first event represents that Customer initiates the invocation of sendPurchaseOrder provided by the Purchase component. Subsequently, Purchase will concurrently invoke the services of three components of Ship, Invoice and Schedule, and return a response to Customer. Simply speaking, the present test case describes a complete purchasing process.

The function configuration of the surrogates used in the above test case is as follows. Table 7 represents that requestShipping( ), upon receiving data referred to by RequestShipping-data-reference, returns a fixed value ShippingInfo-data-reference. Table 8 represents that initiatePriceCalculation( ), upon receiving PurchaseOrderRequest-data-reference, does not need to return any value, since this is a one-directional invocation. The representations of other tables are clear.

TABLE 7

Input/Output Table of shipper_ECI_01
(operation "requestShipping")

| | | Output message | |
|---|---|---|---|
| No. | Input message | Pattern | Parameters |
| 1 | RequestShipping-data-reference | Constant | ShippingInfo-data-reference |

TABLE 8

Input/Output Table of invoicer_ECI_01
(operation "initiatePriceCalculation")

| | | Output message | |
|---|---|---|---|
| No. | Input message | Pattern | Parameters |
| 1 | PurchaseOrderRequest-data-reference | — | — |

TABLE 9

Input/Output Table of invoicer_ECI_01
(operation "sendShippingPrice")

| | | Output message | |
|---|---|---|---|
| No. | Input message | Pattern | Parameters |
| 1 | ShipInfo-data-reference | Constant | Invoice-data-reference |

TABLE 10

Input/Output Table of scheduler_ECI_01
(operation "requestProductionScheduling")

| | | Output message | |
|---|---|---|---|
| No. | Input message | Pattern | Parameters |
| 1 | PurchaseOrderRequest-data-reference | — | — |

Herein, "-- " in Table 8 and Table 10 represents having no expectant return value, for the reason that the above invocation is a one-directional invocation and it is unnecessary to provide a return value.

During execution of the testing, the auto test engine 450 parses the test case and reads out test configuration and test behavior information therefrom. Then, it uses the test configuration information to configure the surrogate using an API (e.g., setConfiguration(String filename)), and then executes the events specified in the test behavior one by one. The test engine leverages runtime monitoring capabilities to capture the actual invocations between services. If it finds a discrepancy during the testing, the test engine stops the execution of the testing and signals a failure to testers.

It is noted that, the above is only a unit test case and the same test behavior can be used in an integration test case. For example, if the Ship process is a real component which has been developed, the service integration testing of the Purchase and Ship processes will only use a surrogate to simulate the Invoice and Schedule processes.

The testing method and testing system according to one embodiment of the present invention are described above in conjunction with the drawings, but the above description is only exemplary but not limited. Those skilled in the art are completely able to make modifications or changes to them as required without departing from the scope of the present invention.

Furthermore, it is obvious that the operation procedure of the method according to the present invention described above can also be implemented in the form of a computer executable program stored in various machine readable storage media.

Moreover, the objects of the present invention can also be implemented by providing a storage medium with codes of the above executable program stored thereon directly or indirectly to a system or device, and then reading out and executing the program codes by a computer or center processing unit (CPU) of the system or device.

At this time, as long as the system or device has a function of executing a program, implementing modes of the present invention are not limited to the program, and the program can be in any form of, for example, an object program, program executed by an interpreter, or script program provided to an operating system, etc.

The machine readable storage media mentioned above may include but not be limited to various memories and storage units, semiconductor devices, magnetic disk units such as optical, magnetic and magneto-optic disks, and other media suitable for storing information, etc.

In addition, the present invention may be achieved by a client computer by connecting to corresponding websites on the Internet, downloading the computer program codes according to the present invention and installing the same into the computer and then executing the program codes.

Finally, it is also noted that, in this document, relational terms such as left and right, first and second, and the like are used merely to distinguish one entity or action from another entity or action without necessarily requiring or implying any actual such relationship or order between such entities or actions. Moreover, the terms "comprise", "comprising," "include" or any other variations thereof, are intended to cover a non-exclusive inclusion so that a process, method, article, or device that comprises a list of elements does not only include these elements but also may include other elements not explicitly listed or inherent to such process, method, article, or device. An element preceded by "a" or "an" does not, without more constraints, preclude the existence of additional identical elements in the process, method, article, or device that comprises the element.

Although the embodiments of the present invention have been described in detail with reference to the accompanying drawings, it should be noted that, these embodiments are only used to illustrate the present invention but not to limit the present invention. Various modifications and changes can be made by those skilled in the art without departing from the spirit and scope of the present invention. Therefore, the scope of the present invention is only defined by the appended claims and the equivalents thereof.

What is claimed is:

1. A service testing method using a surrogate, comprising steps of:
   generating, according to service description of a service to be simulated, a service-specific surrogate for said service to be simulated, wherein the service to be simulated comprises a service for which development is not complete;
   deploying the generated service-specific surrogate onto a runtime system;
   specifying a test case by referring to the generated service-specific surrogate, wherein said test case comprises test configuration having more than one surrogate configuration options and test behavior;
   setting, according to the test configuration, a configuration option of the deployed surrogate on the runtime system; and
   simulating the service to be simulated on the runtime system, and executing test behavior specified in said test case for each of the more than one configuration options.

2. The service testing method of claim 1, further comprising a step of:
   specifying service description for one or more services to be simulated.

3. The service testing method of claim 1, further comprising steps of:
   determining whether there are more surrogate configuration options to be simulated;
   if it is determined that there are still more surrogate configuration options to be simulated, then repeating said step of setting the configuration option of the surrogate, said step of executing the test behavior and said determining step, until there are no more surrogate configuration options to be simulated.

4. The service testing method of claim 1, wherein the service-specific surrogate inherits functions of a surrogate base class.

5. The service testing method of claim 1, wherein said service description may include a functional aspect, a non-functional aspect, statistics and logging of the service to be simulated and/or any combination thereof.

6. The service testing method of claim 5, wherein said non-functional aspect includes one or more out of availability, performance, security and response time of the service.

7. The service testing method of claim 1, wherein it can be used for performing service unit testing and/or service integration testing.

8. The service testing method of claim 1, wherein the service is a module or process having a predetermined function in the development of software.

9. A service testing system using a surrogate, comprising:
   a central processing unit (CPU) coupled to a computer readable memory;
   a surrogate generator for generating, according to service description of a service to be simulated, a service-specific surrogate for said service to be simulated, wherein the service to be simulated comprises a service for which development is not complete;
   a deployer for deploying the generated service-specific surrogate onto a runtime system;
   specifying means for specifying a test case by referring to the generated service-specific surrogate, wherein said test case comprising test configuration having more than one surrogate configuration option and test behavior; and
   setting means for setting, according to the test configuration, a configuration option of the deployed surrogate on the runtime system; and
   a runtime system for simulating the service to be simulated on the runtime system, and executing test behavior specified in said test case for each of the more than one configuration options.

10. The service testing system of claim 9, wherein said runtime system comprises a surrogate runtime and a simulation engine, wherein the surrogate runtime is generated as a result of the surrogate being deployed to the runtime system, and the simulation engine is used for setting configuration of the surrogate runtime, simulating the service to be simulated and executing the test behavior.

11. The service testing system of claim 9, wherein the service-specific surrogate inherits functions of a surrogate base class.

12. The service testing system of claim 9, wherein said service description may include a functional aspect, a non-functional aspect, statistics and logging of the service to be simulated and/or any combination thereof.

13. The service testing system of claim 12, wherein said non-functional aspect includes one or more out of availability, performance, security and response time of the service.

14. The service testing system of claim 9, wherein it can be used for performing service unit testing and/or service integration testing.

15. The service testing system of claim 9, wherein the service is a module or process having a predetermined function in the development of software.

16. A non-transitory computer-readable storage medium with a computer program stored thereon, wherein said computer program, when being executed, causes a computer to execute a service testing method comprising steps of:
generating, according to service description of a service to be simulated, a service-specific surrogate for said service to be simulated, wherein the service to be simulated comprises a service for which development is not complete;
deploying the generated service-specific surrogate onto a runtime system;
specifying a test case by referring to the generated service-specific surrogate, wherein said test case comprises test configuration having more than one surrogate configuration option and test behavior;
setting, according to the test configuration, a configuration option of the deployed surrogate on the runtime system; and
simulating the service to be simulated on the runtime system, and executing test behavior specified in said test case for each of the more than one configuration options.

* * * * *